May 30, 1961     E. JAULMES     2,986,043
AUTOMATIC VARIABLE-SPEED AND CLUTCH UNITS
Filed Aug. 2, 1957     3 Sheets-Sheet 1

INVENTOR:
ERIC JAULMES
BY

May 30, 1961  E. JAULMES  2,986,043
AUTOMATIC VARIABLE-SPEED AND CLUTCH UNITS
Filed Aug. 2, 1957  3 Sheets-Sheet 3

INVENTOR:
ERIC JAULMES

United States Patent Office

2,986,043
Patented May 30, 1961

2,986,043

AUTOMATIC VARIABLE-SPEED AND CLUTCH UNITS

Eric Jaulmes, Paris, France, assignor to Ateliers de la Motobecane, Societe Anonyme Francaise, Pantin (Seine), France Filed Aug. 2, 1957, Ser. No. 676,005

Claims priority, application France Dec. 5, 1956

5 Claims. (Cl. 74—230.17)

Variable-speed devices are known having an expanding pulley with truncated conical flanges and a trapezoidal belt. Clutches have also been produced by acting on one of the flanges of these pulleys which is then capable of moving sufficiently away from the other flanges to lose contact with the trapezoidal belt, which then rests on a rotating sleeve between the two flanges. Hitherto this axial movement of the movable flange has been controlled by hand by means of a suitable control transmission.

The principal object of the present invention is to provide means by which a clutch of this kind may be controlled automatically without manual intervention, for example at the moment of starting the motor of a vehicle such as a scooter or autocycle which already includes an automatic variable speed device of the kind in question.

To this end according to the present invention the members already provided to control the automatic change of speed itself are also put to use to control clutching. Starting with a given expanding pulley normally used as part of an automatic centrifugal variable-speed gear and combined either with another expanding pulley or with a simple pulley, the centre distance of these two pulleys being then variable, the movable flange which is subject to the action of the centrifugal members is given a greater travel than normally to permit it to lose contact with the belt under the action of a spring which tends to separate the two flanges of the pulley from one another. The pulley thus when at rest attains a declutched position with the belt resting on a conventional central rotary sleeve.

In a preferred embodiment of the invention this spring in addition provides a resilient rotary drive to the axially movable flange, a drive which can no longer be provided by the belt itself after it has lost contact with the flange.

Thus this spring works in two ways and naturally under different conditions in order to achieve these two functions.

If a centrifugal pulley operated in this way is rotated by the motor of a vehicle its centrifugal members, the action of which is opposed to that of the spring, displace the movable flange towards the fixed flange until the moment that the trapezoidal belt is gripped laterally between the two flanges. The "clutching" phase is thus completed. As the speed increases the two flanges approach one another more and more closely while the trapezoidal belt runs on increasing effective diameters, this being the "variable-speed" phase of the same device.

In the case in which the expanding pulley is already associated with the centrifugal clutch mechanism mounted on the same shaft as the pulley it is possible to use the springs in question in an arrangement which is at the same time very simple and very economical, no longer to bring about declutching since this is already controlled by the centrifugal clutch mechanism provided, but nevertheless to act resiliently on the movable flange of the pulley which thus tends to return of its own accord to its position corresponding to a minimum effective diameter of the belt.

The mechanism is thus steadied in operation, changes of speed of the vehicle are made with more flexibility and the operation is more satisfactory than in the absence of the return springs in question by reason particularly of the slight relative rotary movements which are thus permitted between the two flanges of the expanding pulley.

In the accompanying drawings there are shown schematically various alternative constructions of the invention. In these drawings.

Figure 1:
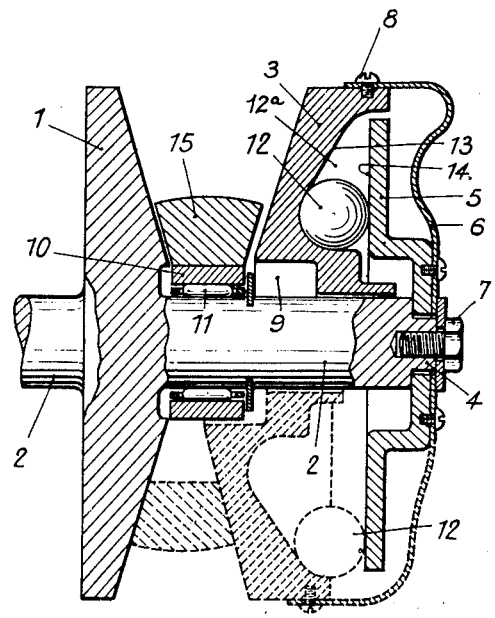
Figure 1 is a longitudinal sectional view of a first embodiment of the invention.
Figure 2:
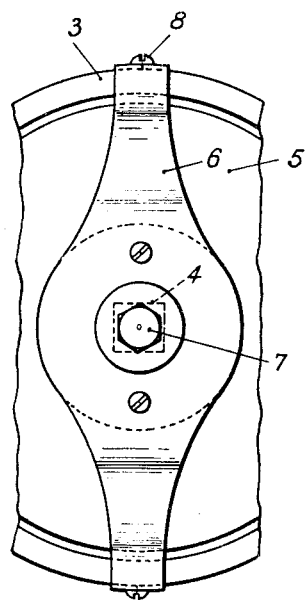
Figure 2 is a partial end elevational view from the right of the pulley in Figure 1.

In Figures 1 and 2 a fixed flange 1 of the expanding pulley is integral with the motor shaft 2. A movable flange 3 slides freely on the shaft 2, but is connected to it for rotary movement by the following means: the shaft 2 has a squared end 4 on which is fitted a plate 5. On this same squared end is also mounted a blade spring 6, the components 5 and 6 being fixed by a common screw 7 on the shaft 2. At its two ends the blade spring 6 is attached by screws 8 to the periphery of the movable flange 3, the hub of which is formed with a recess 9 capable of receiving a sleeve 10 mounted on a needle bearing 11 on the shaft 2 when the movable flange 3 approaches the fixed flange 1. A number of balls 12 lying in recesses 12a and acting as centrifugal members bear simultaneously against an inclined face or cam surface 13 of the movable flange 3 and also against the opposite inner face 14 of the plate 5. A suitable choice of the thickness, cross section and outline of the edges of the spring 6 enables the two desired characteristics to be obtained which are necessitated by the dual function of this spring. A trapezoidal belt 15 runs between the flanges 1 and 2.

In the upper part of Figure 1 the parts are shown in their positions when the expanding pulley is at rest. The blade spring 6 withdraws the flange 3 towards the right so that it loses contact with the belt 15. This is the declutched position in which this belt can slip between the flanges 1 and 3 and rests against the rotary idling sleeve 10.

If the shaft is rotated it drives the movable flange 3 through the blade spring 6 and the centrifugal pulleys 12 thus operate to displace the flange 3 towards the left against the resilience of the spring 6. The space between the flange 3 and the belt 15 is thus taken up so as to produce engagement between the pulley and the belt and then as the speed of rotation increases the centrifugal balls 12 bring the flange 3 closer to the flange 1 at the same time as the belt 15 runs at an increasing diameter on the pulley to arrive finally at the high speed position shown in the lower part of Figure 1.

It will be seen that this additional function of an automatic clutch is carried out by the expanding pulley by means simply of the provision of additional travel for the movable flange 3 and the addition of the blade spring 6, the action of which is opposed to that of the centrifugal balls 12, the idling rotary sleeve 10 being already provided in conventional expanding pulleys.

Figure 4:
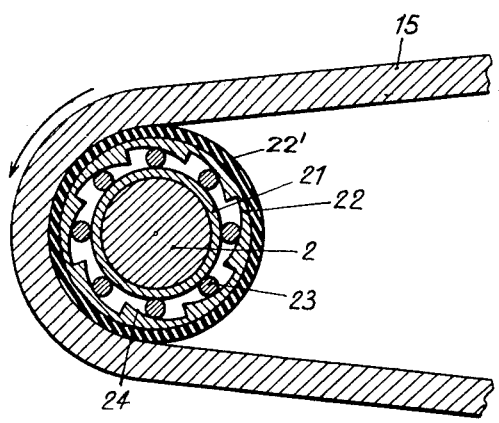
Fig. 4 is a fragmentary cross-sectional view indicating a new and improved construction particularly suitable for autocycles.

Fig. 4 relates to an improved construction applicable with advantage to autocycles or other light vehicles capable of being propelled by pedalling at least while starting the auxiliary motor with which they are provided. It provides in a very simple and effective manner an automatic clutch in the transmission in the direction of rear wheel to motor, permitting, in particular, starting of the motor by the pedals.

Figure 3:
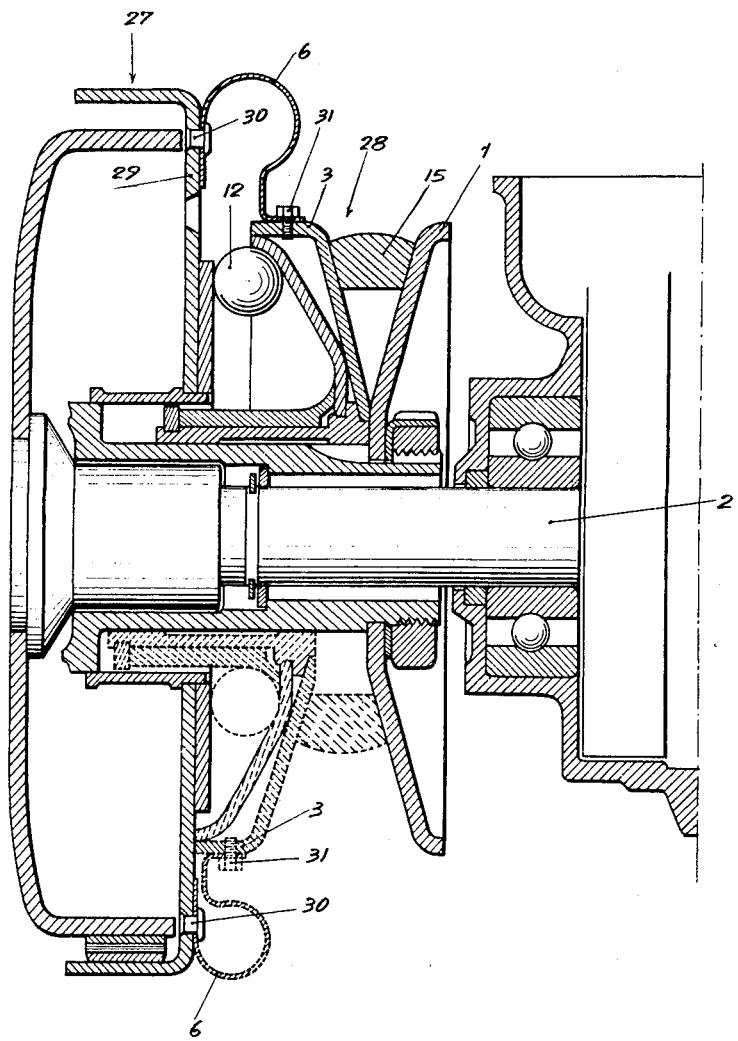
Figure 3 is a longitudinal sectional view of a last embodiment of the invention.

This variation differs in construction from the preceding one only in the free-wheel mechanism of construction, otherwise well known, which is substituted for the simple rolling bearing shown at 11 in Figs. 1 to 3.

It will be seen in Fig. 4 that the inner race 21 of the free-wheel is fixed to the motor shaft 2. Its outer race 22 replaces the idling sleeve 10 driving rollers 23, being interposed between the races 21 and 22. The outer face has a convoluted toothed inner surface. Preferably, the outer race 22 is coated with corundum or special rubber with a high coefficient of friction. Such a coating is indicated at 22'.

The operation of this device is as follows: When the autocycle is started by pedalling its rear wheel drives the trapezoidal belt 15 which turns in the direction of the arrow and the outer race 22 and the cam face 24 are so directed that the free-wheel then jams so as to drive the shaft 2 for the purpose of starting the motor. When the latter starts, the inner race 21 turns faster than the outer race 22 and the free-wheel operates to disconnect the motor from the transmission.

At a predetermined speed of rotation of the motor corresponding to an appropriate choice of the slope of the cam face 13 and the mass of the centrifugal balls 12 as well as the characteristics of the spring 6 or 16, the action of the centrifugal balls then produces clutch engagement followed by automatic variation of speed in the manner described above. The operations follow one another in the reverse order when the vehicle slows down. The belt 15 then runs with a decreasing diameter as the movable flange 3 moves away from the fixed flange 1 and then the movable flange 3 loses contact with the belt 15 which again rests on the outer race 22 of the free-wheel, the inner race 21 of which can continue to turn freely by reason of the direction of the cam face 24 which allows the motor to turn at slow speed while the machine is at rest.

Figure 5:
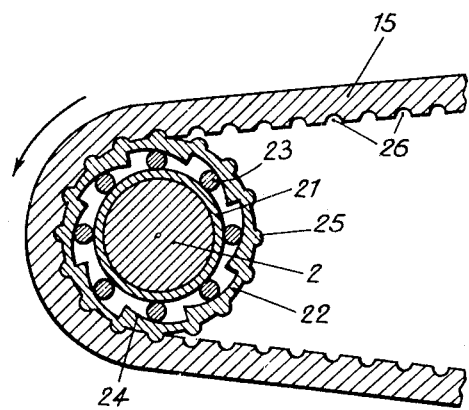
Fig. 5 indicates a modification of the embodiment in Fig. 4.

Fig. 5 shows transverse ribs 25 provided on the periphery of the race 22 of the free-wheel and corresponding grooves 26 of the trapezoidal belt 15. These ribs and grooves resist all sliding of the belt 15 on the outer race 22 which might interfere with driving of the motor by the rear wheel on starting the vehicle.

In this improvement the belt 15 is thus used on three faces, its inner face operating only for the purpose of starting a motor after which it operates on its two oblique side faces for the purpose of clutching engagement and then for variation of speed.

Moreover, the resilience of the springs, such as 6 or 16, introduces an additional technical result: It permits a slight floating of the movable flange 3 which facilitates radial movement of the trapezoidal belt between the two flanges of the pulley. The change of ratio of the transmission thus takes place more freely with a more exact response to variations of speed-torque conditions.

It will be understood that numerous modifications in detail may be made in the device described and shown here without passing outside the scope of the invention.

Figure 3 is a longitudinal section of an autocycle transmission consisting of an expanding pulley and a centrifugal clutch in combination. The motor shaft is again indicated at 2, the centrifugal clutch at 27 and the expanding pulley at 28, its fixed flange being again indicated at 1 and the trapezoidal belt at 15.

In this construction the springs 6, which are joined to the periphery of the movable flange 3 of the expanding pulley and which tend to withdraw this flange against the action of the centrifugal balls 12, are directly fixed at their other ends to a plate 29 carrying the mechanism 32 of the associated centrifugal clutch 27. These springs are distributed in an appropriate number round the periphery of the flange 3 and the plate 29.

In the construction shown the blade springs 6 are riveted at 30 to the plate 29 and screwed at 31 to the movable flange 3. It goes without saying that any other means of fixing such as welding or simple insertion may be used at one end or at the other of these springs. Their shape and number may likewise be chosen according to the particular circumstances of use.

I claim:
1. An automatic variable-speed and clutch unit, comprising in combination a central rotary shaft, two opposed sloping pulley flanges coaxial with said central shaft, a belt of trapezoidal section adapted to run between said flanges, said flanges including a first movable flange and a second flange fixed to said shaft, said first flange being freely mounted on said shaft, and relatively movable axially between a separated position in which said flanges release said belt and a close position in which said flanges grip said belt and move it radially, a plate coaxial to said pulley flanges, said first flange having an outer cam surface, centrifugal means including a plurality of centrifugal balls engaging said plate and said cam surface, and operating upon rotation to urge said first flange toward said close position, and blade springs terminally secured to said first flange and said plate elastically urging said first flange toward said plate to said separate position, and elastically coupling said flange to said plate for rotation therewith.

2. An automatic variable-speed and clutch unit comprising in combination a central rotary shaft, two opposed sloping pulley flanges coaxial with said central member and rotatable therewith, a belt of trapezoidal section adapted to run between said flanges, said flanges including a first relatively movable flange and a second flange fixed to said shaft, said first flange being relatively movable axially between a separated position in which said flanges release said belt and a close position in which said flanges grip said belt and move it radially, a plate fixed to said shaft, said first flange having a cam surface, centrifugal means including a plurality of centrifugal balls engaging said plate and said cam surface and operative upon rotation to urge said first flange toward said close position, blade springs terminally secured to said first flange and said plate urging said first flange toward said plate to said separated position, a combined free wheeling and clutch assembly mounted on said shaft between said pulley flanges, said assembly including an inner race fixed to said shaft, an outer race concentrically disposed about said inner race, said outer race having a convoluted toothed inner surface defining cam surfaces, said belt being engageable with said outer race when said flanges are in a separated position, and bearings disposed between said inner and outer surfaces to permit free rotation of said shaft relative to said outer race in a first direction and driving engagement for rotation of said shaft by said belt when said flanges are in a separated position.

3. The unit set forth in claim 2, wherein said outer race has its outer surface provided with a plurality of spaced transverse ribs, said belt being provided with transverse grooves therein for engagement with said ribs.

4. An automatic variable-speed and clutch unit, comprising in combination a central rotary shaft, two opposed sloping pulley flanges coaxial with said central member, a belt of trapezoidal section adapted to run between said flanges, said flanges including a first movable flange and a second flange fixed to said shaft, said first flange being freely mounted on said shaft, and relatively movable axially between a separated position in which said flanges release said belt and a close position in which said flanges grip said belt and move it radially, a plate fixed to said shaft, said first flange having an outer cam surface, centrifugal means including a plurality of centrifugal balls engaging said plate and said cam surface, and operating upon rotation to urge said first flange toward said close position, and blade springs terminally secured to said first flange and said plate elastically urging said first flange toward said plate to said separated position, and elastically coupling said flange to said plate for rotation therewith.

5. An automatic variable-speed and clutch unit, comprising in combination a central rotary shaft, two opposed sloping pulley flanges coaxial with said central member, a belt of trapezoidal section adapted to run between said flanges, said flanges including a first movable flange and a second flange fixed to said shaft, said first flange being freely mounted on said shaft, and relatively movable axially between a separated position in which said flanges release said belt and a close position in which said flanges grip said belt and move it radially, a centrifugal clutch device, a plate forming part of said centrifugal clutch device, said first flange having an outer cam surface, centrifugal means including a plurality of centrifugal balls engaging said plate and said cam surface, and operating upon rotation to urge said first flange toward said close position, and blade springs terminally secured to said first flange and said plate, elastically urging said first flange toward said plate to said separated position, and elastically coupling said flange to said plate for rotation therewith.

References Cited in the file of this patent

UNITED STATES PATENTS

| | | |
|---|---|---|
| 1,915,107 | Sweigart | June 20, 1933 |
| 2,050,358 | McElroy et al. | Aug. 11, 1936 |
| 2,132,841 | Baumgartner | Oct. 11, 1938 |
| 2,397,312 | Forrest | Mar. 26, 1946 |
| 2,496,061 | Miner | Jan. 31, 1950 |
| 2,538,667 | Chamberlin | Jan. 16, 1951 |
| 2,556,512 | Ammon | June 12, 1951 |
| 2,678,566 | Oehrli | May 18, 1954 |
| 2,715,842 | Homuth | Aug. 23, 1955 |
| 2,795,962 | Uher | June 18, 1957 |

FOREIGN PATENTS

| | | |
|---|---|---|
| 1,141,602 | France | Mar. 18, 1957 |